ND
United States Patent [19]

Ryan et al.

[11] 4,020,925
[45] May 3, 1977

[54] BICYCLE BRAKING SYSTEM

[76] Inventors: John W. Ryan, 674 Nimes Road, Los Angeles, Calif. 90024; James D. Moore, 6810 Locklenna Lane, Palos Verdes, Calif. 90274

[22] Filed: Nov. 10, 1975

[21] Appl. No.: 630,309

[52] U.S. Cl. .................................................. 188/24
[51] Int. Cl.² .......................................... B62L 3/08
[58] Field of Search ...................... 188/2 D, 24, 26; 192/6 R

[56] References Cited

UNITED STATES PATENTS 3,782,507  1/1974  Shreve ............................. 188/2 D

FOREIGN PATENTS OR APPLICATIONS 852,616  10/1939  France ............................. 188/2 D
268,439  1927  United Kingdom

*Primary Examiner*—Duane A. Reger
*Attorney, Agent, or Firm*—Herzig & Walsh, Inc.

[57] ABSTRACT

An improvement in braking of the wheels of a bicycle wherein both front and rear wheels are equipped with a coaster brake. Flexible connections are provided between the reaction torque arm of the rear coaster brake and the front brake for applying the front brake. Interposed in the connections is a proportioning lever mechanism for adjustably controlling the amount of braking effect transmitted to the front brake. Flexible connections are provided from the reaction torque arm of the front brake back to the lever mechanism for applying a feedback increment of actuation to the front brake. The system increases the effectiveness of the front brake by taking fuller advantage of the weight transfer which occurs in stopping, and the function of preventing throwing the rider over the handlebars is preserved while the positive feedback increment of control increases the braking effort of the front wheel in proportion to the increased load on the front wheel, which occurs in stopping.

10 Claims, 7 Drawing Figures

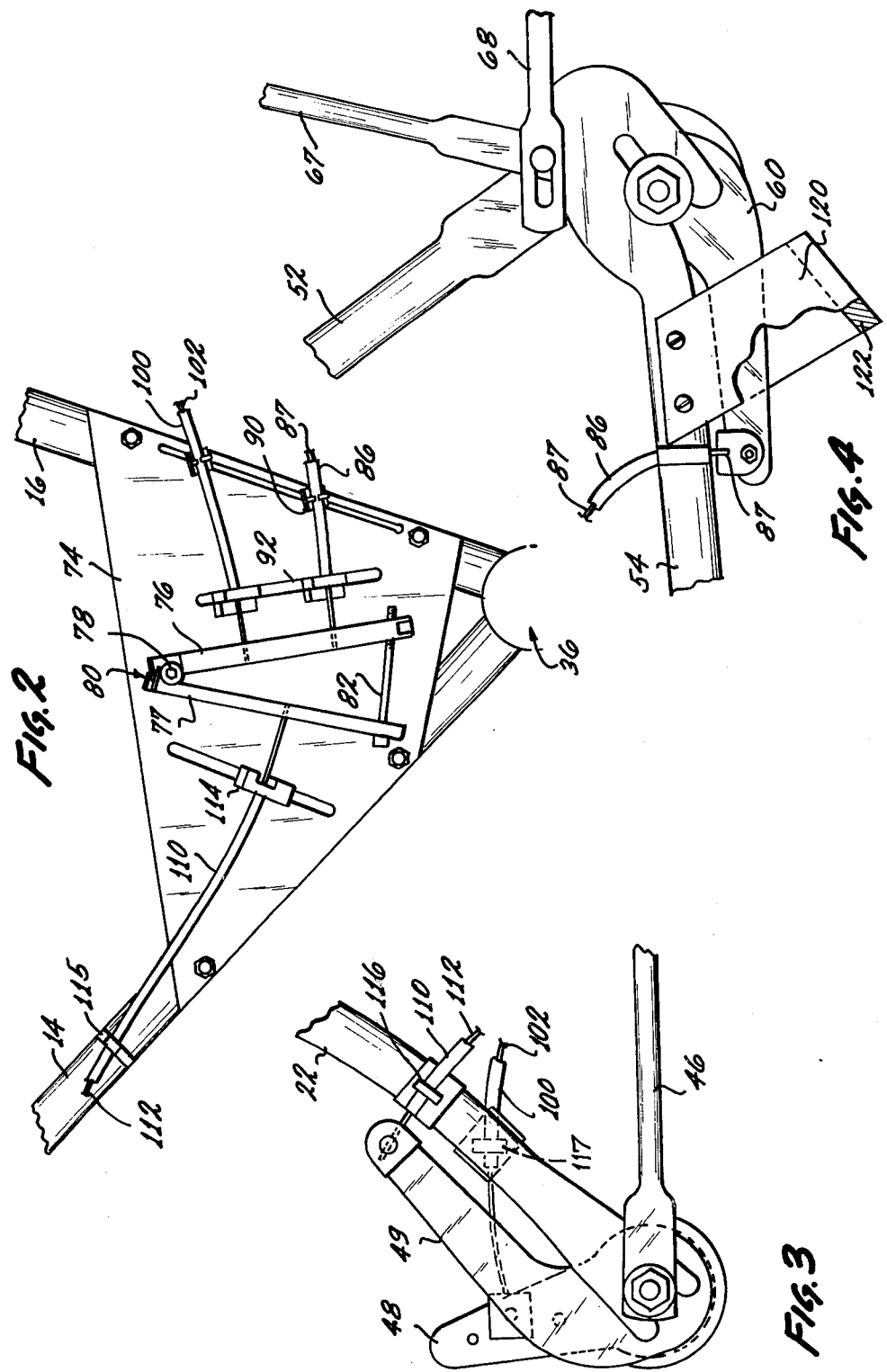

BICYCLE BRAKING SYSTEM

BACKGROUND OF THE INVENTION

1. Field of the Invention

The field of the invention is that of vehicles having brakes and more particularly two-wheeled vehicles, or more specifically bicycles wherein both the front and rear wheels are equipped with standard coaster brakes. Although in the exemplary form of the invention it is adapted in a bicycle the basic invention can be adapted in any two-wheeled vehicle including motorcycles.

2. Description of the Prior Art

Two-wheeled vehicles, more particularly bicycles, are of course well known in the art. Included in the known prior art of bicycles are, of course, those wherein both the front and rear wheels are equipped with standard coaster brakes. Typically the coaster brake of the rear wheel is operated by back pedaling tending to cause reverse rotation of the rear sprocket. It is also known in the art to provide connections or other means whereby upon application of braking action to the rear wheel, braking action is simultaneously applied to the front wheel. The dual brake as described is designed to prevent throwing of the rider over the handlebars when stopping since as known during stopping there is a transfer of weight to the front wheel. The herein invention goes beyond these prior art teachings as explained in detail hereinafter.

SUMMARY OF THE INVENTION

In the exemplary form of the invention as described in detail herein it is applied in a bicycle having conventional front wheel and rear wheel coaster brakes. Connecting means are provided between the reaction torque arm of the rear brake and the front brake so that braking action is applied to the front brake when the rear wheel is braked. The connections include a pivoted proportioning lever by means of which the increment of control responsive to rear brake actuation that is transmitted to the front brake is adjustable. Connections are provided from the reaction torque arm of the front brake through the proportioning lever and back to the front brake reaction torque arm to provide an increment of feedback, that is positive feedback to adjustably increase the braking effect at the front wheel.

The system embodies the basic feature of dual brakes, that is the prevention of throwing the rider over the handlebars during stopping. Additionally, however, the system realizes the objection of increasing the effectiveness of the front brake by taking more full advantage of the weight transfer which occurs in stopping. That is during stopping there is a transfer of weight to the front wheel. The amount of positive feedback to the front brake is appropriately adjusted to produce the desired results.

Further objects and additional advantages of the invention will become apparent from the following detailed description and annex drawings.

BRIEF DESCRIPTION OF THE DRAWINGS

FIG. 2 is an enlarged view of the proportioning lever and the flexible connections to it;

FIG. 3 is a detail view showing the actuating arm for the front brake and the front torque reaction arm;

FIG. 4 is a detail view showing the reaction torque arm of the rear brake.

DESCRIPTION OF THE PREFERRED EMBODIMENTS

Figure 1:
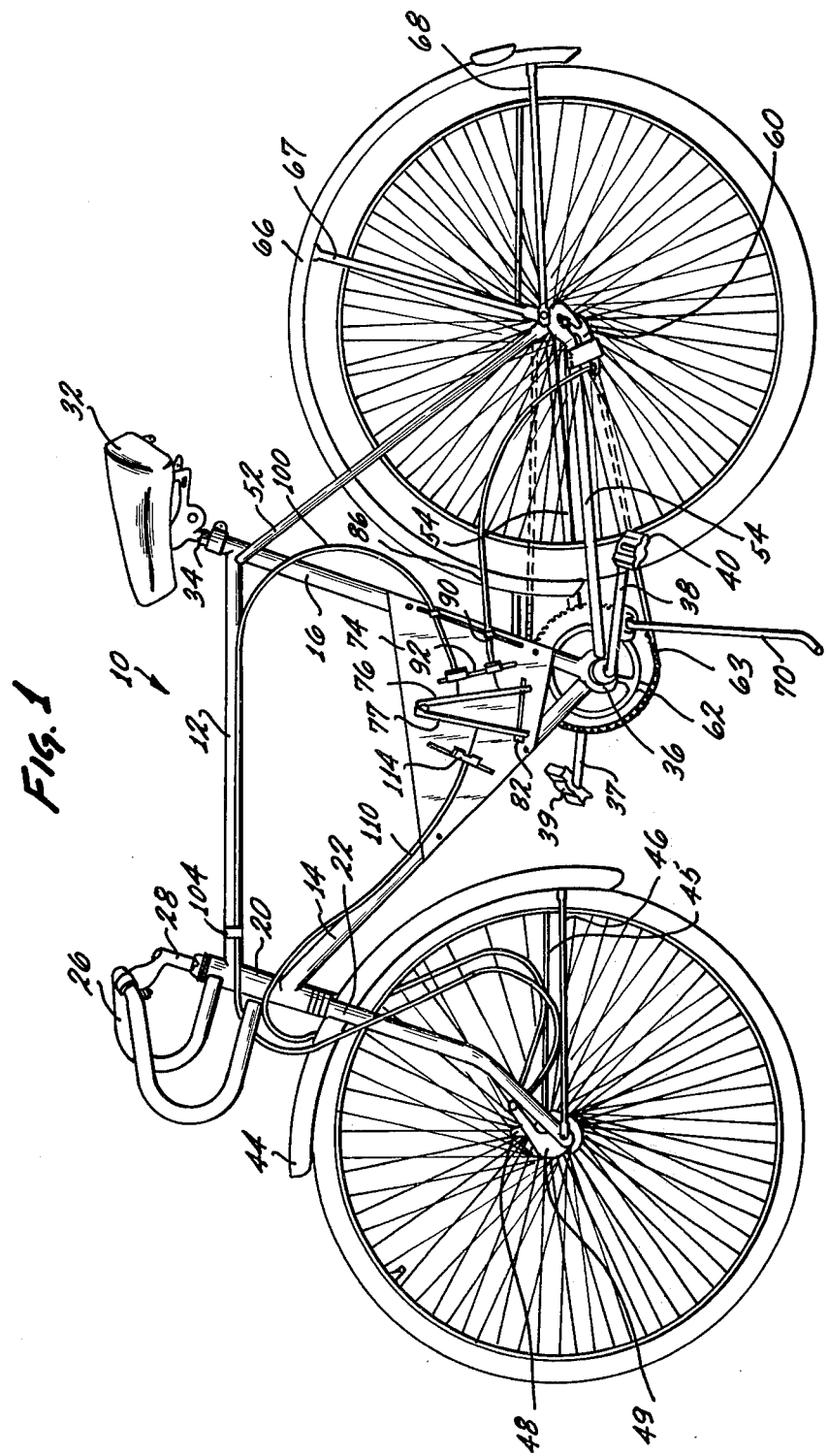
FIG. 1 is a view of a bicycle having the braking system of the invention installed.

Referring to FIG. 1 of the drawings there is shown a bicycle designated by the numeral 10 of generally typical construction. The frame comprises a top horizontal member 12 and diagonal members 14 and 16. Numeral 20 designates a front frame member which forms a hub and in which is journalled the stem of the front fork 22. The handlebars are designated at 26 attached to a handlebar stem 28 connected to the stem of the front fork and journalled in the frame member 20.

Numeral 32 designates a conventional seat mounted on a stem 34 received in the rear frame member 16, the frame members typically being tubular.

Frame members 14 and 16 are both joined to a hub 36 in which is journalled the pedal crank which carries the pedal arms 37 and 38 at the ends of which are the pedals 39 and 40.

Numeral 44 designates the front fender which fits in the front fork 22, numerals 45 and 46 designating fender supports or braces which extend to the arms of the front fork 22. Numeral 48 designates an actuating arm for the front coaster brake and numeral 49 designates the reaction torque arm of the front brake.

Numeral 52 designates the rear fork extending downwardly from the frame member 16 to the axle of the rear wheel. Numerals 53 and 54 designates frame members extending rearwardly from the hub 36 to the axle of the rear wheel. Numeral 60 designates the rear reaction torque arm.

Numeral 62 designates the sprocket which is on the pedal crank and which drives sprocket chain 63 which passes over the rear sprocket which drives the rear wheel. Numeral 66 designates the rear fender which is between the legs of the rear fork 52 and which is supported by supporting members or braces, two of which are designated at 67 and 68. Numeral 70 designates a conventional stand for the bicycle.

Numeral 74 designates a plate of rectilinear shape which is mounted by being attached to the frame members 14 and 16 as best seen in the enlarged view FIG. 2. Carried on plate 74 is the proportioning lever mechanism which is interposed in the connections between the front and rear brakes. The proportioning lever mechanism comprises a first lever 76 and a second lever 77, both pivoted on a pivot stem 78, the end of the lever 76 being interposed between forks on the end of the lever 77 as designated at 80. The lever members 76 and 77 are at an angle as shown and extending between them is a bolt 82, the end of which is threaded into the lever 76, so that by adjusting the bolt, the angle between the two lever members can be adjusted.

Numeral 86 designates a tube or tubular member through which passes a flexible cable 87 that connects to the rear reaction torque arm 60 as may be seen in FIG. 1. The tube 86 is supported in a clamp 90 on the frame 74 and it extends to the lever 76 through an opening in bracket member 92 carried by member 74. The tube 86 and its cable 87 extends to the rear torque reaction arm 60 which the cable 87 is attached as shown.

Numeral 100 designates a further tube having within it a cable 102. The tube 100 and the cable it carries passes upwardly and along the upper frame member 12 as may be seen in FIG. 1 to which it is clamped by clamp 104 and it extends to the brake reaction arm 49 as may be seen in FIG. 3. Cable 102 extends through an opening in guide 92, previously referred to, and connects to the lever member 76.

Numeral 110 designates a further tube in which is a flexible cable 112, connected to the lever 77 and extending through an opening in a further guide member 114. Tube 110 is clipped or clamped to the frame member 14 by a clamp 115. It is clipped or clamped to fork 22 by clip 116 and the cable 112 connects to the end of the front actuating arm 48 as shown in FIG. 3.

Numeral 120 designates a bracket secured to the rear frame member 54, through which the rear torque reaction arm 60 extends, bracket 120 having a part 122 for purposes of limiting the movement of the torque reaction 60.

OPERATION

The rear coaster brake is operated in the conventional manner by back pedaling to apply reverse torque to the rear sprocket and to the rear coaster brake. When braking is thus applied the rear reaction torque arm 60 moves or rotates in counterclockwise direction pulling on the cable 87. This exerts a pull on the proportioning lever arm 76, moving it counterclockwise and imparting a proportional movement to the cable 112. The movement imparted to cable 112 is proportionately less since it is connected nearer to the pivot point of lever 76. This motion is transmitted through cable 112 to the front brake actuating arm 48 so that braking is applied to the front brake in a proportional amount determined by the connections of the cables to the lever arm 76. The application of braking to the front brake causes the front torque reaction arm 49 to move angularly that is to rotate in a counterclockwise direction to impart movement to the cable 102. This movement is transferred to the lever 76 in a proportional amount determined by the point of connection of cable 102 to the lever 76, and this motion is in turn transferred to the lever 77. Thus it is to be seen that upon actuation of the rear brake, braking is applied to the front brake and then there is a positive feedback of motion back to the proportioning lever mechanism which applies additional limited braking effect to the front wheel.

In this manner the objectives of the invention are realized. In the event of braking to stop, braking is applied to both the front and rear wheels. The effectiveness of the front brake is increased by taking full advantage of the weight transfer which occurs in stopping. The amount of positive feedback sent back to the front brake is adjustable by the proportioning lever mechanism. The amount of positive feedback is less than the "lock up" amplification factor for the brake. Significantly, braking effort is increased in proportion to the increased load on the front wheel.

Figure 5:
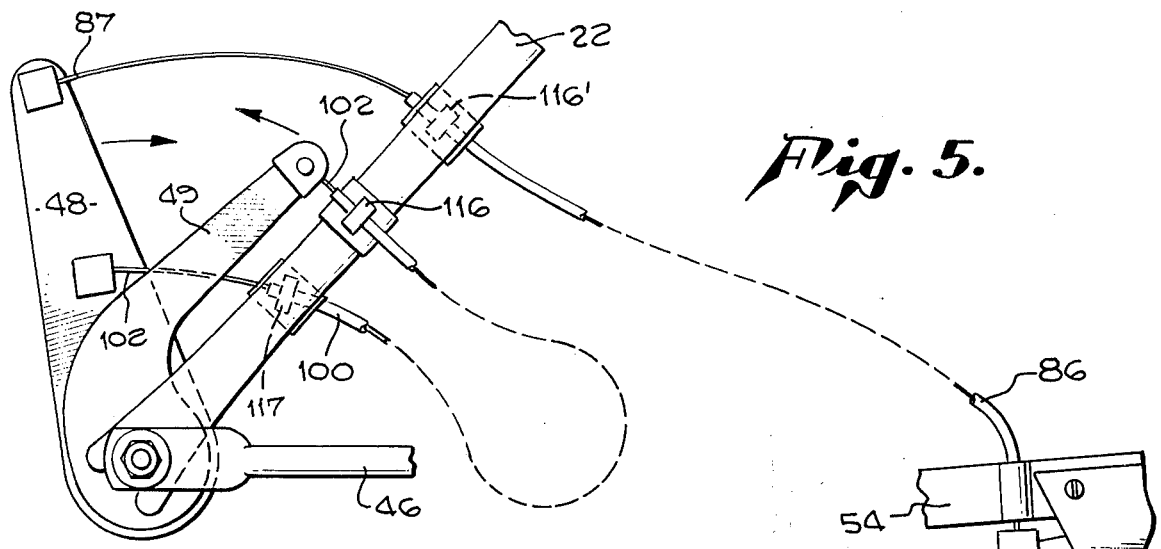
FIGS. 5 and 6 are schematic views of modified forms of the invention.

FIG. 5 is a schematic view of a simplified form of the systems of FIGS. 1-3. Corresponding parts are identified by the same reference numerals. The directions of rotation are indicated by the arrows. In this form of the invention, the plate 74 is omitted as well as the lever arms 76-77. Cable 87 connects directly to actuating arm 48 to apply braking to the front wheel. The torque reaction arm 49 rotates counterclockwise. It is connected to the cable 102 which supplies feedback to the actuating arm 48. The amount or degree of feedback is determined by the relative radial distances of connection of the cables 87 and 102 to the arm 48.

Figure 6:
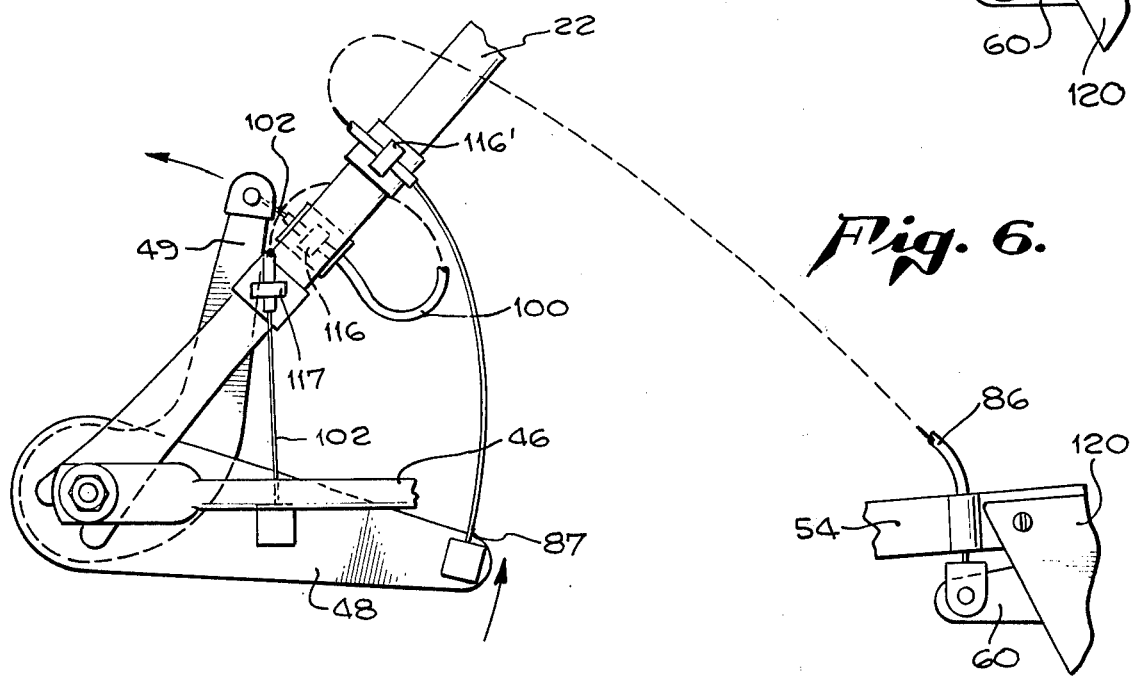

FIG. 6 is an arrangement which is like that of FIG. 5 except that the front wheel and its hub have been turned through 180° about a vertical axis through the center of the hub. The actuating arm 48 and the torque reaction arm 49 are respectively now on opposite sides of the wheel from their positions as shown in FIG. 5. As before, the rear torque reaction arm 60 acting through the cable 87 acts on the arm 48 to apply braking to the front wheel. The torque reaction arm 49 moves in a counterclockwise direction pulling on the cable 102 as before to apply feedback to the actuating arm 48.

Figure 7:
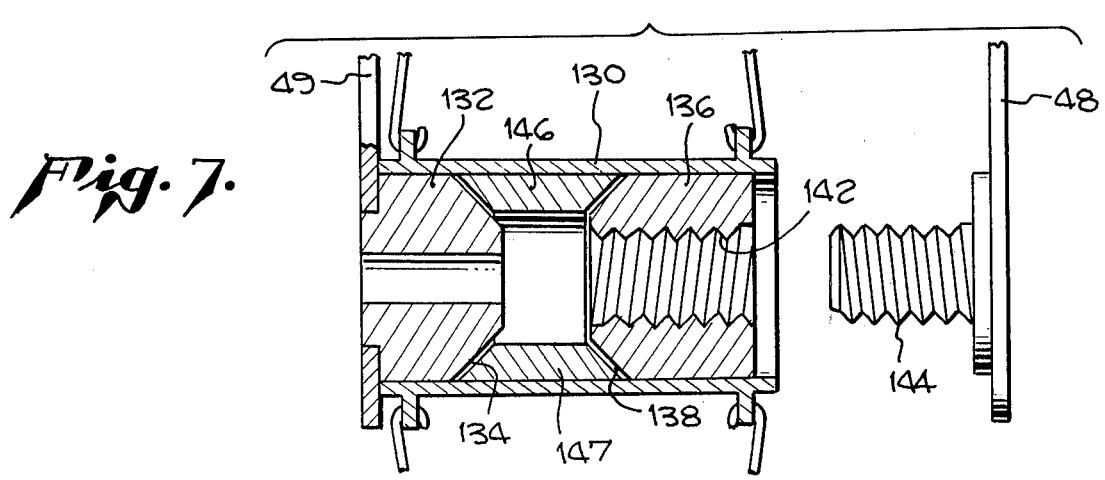
FIG. 7 is a schematic sectional view of a typical bicycle coaster brake.

The reason for the variation of FIG. 6 is to realize the result that the actuating arm 48 moves in a desired direction relative to the coaster brake. FIG. 7 is a schematic view of a typical bicycle coaster brake. In one end of the hub is the member 132 having a conical or tapered inside end part 134. In the other end of the hub is member 136 having a conical or tapered end part 138 and having a threaded bore 142 as shown. The actuating arm 48 carries the threaded member 144 that fits into the bore 142 for actuating the brake. Between the ends of the members 132 and 136 are a plurality or group of brake shoes 146 and 147 configurated to fit inside of the hub 130 and having beveled or tapered sides as shown to be congruent to the conical surfaces 134 and 138. In operation when the arm 48 is actuated the threaded part 144 turns within the threaded bore 142 tending to drive the member 136 inwardly with the shoes 146-147 become compressed between the conical surfaces 134 and 138 driving the shoes outwardly to provide braking. By turning the wheel around as described the movement of actuating arm 48 in braking direction can be arranged to be either clockwise or counterclockwise as desired.

The foregoing disclosure is representative of a preferred form of the invention and is to be interpreted in an illustrative rather than a limiting sense, the invention to be accorded the full scope of the claims appended hereto.

What is claimed is:

1. In a braking system for a two-wheeled vehicle having a front wheel coaster brake and a rear wheel coaster brake having a reaction torque arm, means for actuating the rear brake, means responsive to actuation of the rear brake for actuating the front brake and feedback means for transmitting an impulse resulting from actuation of the front brake to apply modified braking to the front brake.

2. A system as in claim 1, including means whereby the impulse transmitted from application of braking to the front brake is caused to deliver a proportioned additional braking inpulse to the front brake.

3. A system as in claim 1, including a proportioning device in the connections between the rear brake and the front brake, the connections to the proportioning device being positioned whereby a proportion of the impulse originating at one brake is transmitted to the other brake.

4. In a braking system for a two-wheeled vehicle having a front wheel coaster brake and a rear wheel coaster brake means for actuating the rear brake, means responsive to actuation of the rear brake for actuating the front brake and feedback means for transmitting an impulse resulting from actuation of the front brake to apply increased braking to the front brake, a proportioning device in the connections between the rear brake and the front brake, the connections to the proportioning device being positioned whereby a proportion of the impulse originating at one brake is transmitted to the other brake, said proportioning device comprising lever means, there being connections from the front and rear brakes to the lever means and connected thereto at predetermined positions relative to the pivot point of the lever means.

5. A system as in claim 3, including means permitting limited angular movement of the reaction torque arm of the rear brake and a connection from the reaction torque arm to said proportioning means.

6. A system as in claim 4, wherein said lever means comprises a pair of levers positioned in angular relationship and movable together about a common pivot.

7. An apparatus as in claim 1, including a flexible connection from the reaction torque arm of the rear coaster brake to the actuating arm of the front coaster brake, and a flexible connection from the torque reaction arm of the front coaster brake to the brake actuating arm of the front coaster brake.

8. A system as in claim 7, wherein the said brake actuating arm and torque reaction arm of the front coaster brake are on one side of the wheel.

9. In a braking system for a two-wheeled vehicle having a front wheel brake and a rear wheel brake, means for actuating the rear brake, means responsive to actuation of the rear brake for actuating the front brake and feedback means for transmitting an impulse resulting from actuation of the front brake to apply increased or decreased braking to the front brake.

10. A system as in claim 9, including means whereby the impulse transmitted from application of braking to the front brake is caused to deliver a proportioned additional braking impulse to the front brake.

* * * * *